United States Patent
Stancil et al.

(10) Patent No.: US 11,354,532 B1
(45) Date of Patent: Jun. 7, 2022

(54) CONTENT REPRESENTATIONS

(71) Applicant: HEWLETT-PACKARD DEVELOPMENT COMPANY, L.P., Spring, TX (US)

(72) Inventors: Charles J. Stancil, Spring, TX (US); Lee Warren Atkinson, Taipei (TW)

(*) Notice: Subject to any disclaimer, the term of this patent is extended or adjusted under 35 U.S.C. 154(b) by 0 days.

(21) Appl. No.: 17/363,431

(22) Filed: Jun. 30, 2021

(51) Int. Cl.
| | |
|---|---|
| H04N 7/15 | (2006.01) |
| G06K 9/62 | (2022.01) |
| H04L 65/403 | (2022.01) |
| H04N 1/32 | (2006.01) |
| G06V 10/75 | (2022.01) |
| G06V 20/40 | (2022.01) |

(52) U.S. Cl.
CPC ......... *G06K 9/6215* (2013.01); *G06V 10/751* (2022.01); *G06V 20/40* (2022.01); *H04L 65/403* (2013.01); *H04N 1/32149* (2013.01); *H04N 7/15* (2013.01)

(58) Field of Classification Search
CPC . G06K 9/62; G06K 9/00; H04L 29/06; H04N 7/15; H04N 1/32
USPC .......................................... 348/14.01–14.16
See application file for complete search history.

(56) References Cited

U.S. PATENT DOCUMENTS

| | | | |
|---|---|---|---|
| 6,654,032 B1 | 11/2003 | Zhu et al. | |
| 9,035,991 B2 | 5/2015 | Shen et al. | |
| 10,216,761 B2* | 2/2019 | Slaney | ................ G06F 16/5838 |
| 10,986,301 B1* | 4/2021 | Schanz | .................... H04S 7/303 |
| 2010/0205537 A1 | 8/2010 | Knighton et al. | |
| 2013/0132862 A1 | 5/2013 | Noel | |
| 2016/0094593 A1 | 3/2016 | Priya | |
| 2017/0293458 A1 | 10/2017 | Poel et al. | |
| 2021/0385212 A1* | 12/2021 | Tagra | ..................... G06V 40/20 |

* cited by examiner

*Primary Examiner* — Melur Ramakrishnaiah
(74) *Attorney, Agent, or Firm* — Conley Rose, P.C.

(57) ABSTRACT

In some examples, a host device comprises a network interface and a processor. The processor is to, in response to a request to share content with a remote device, display the content in a graphical user interface. The content is a video. The processor is to generate an image of the content. The image is a frame of the video. The processor is to generate a first representation of the image, receive second and third representations of the image via the network interface, determine a first similarity between the first representation and the second representation, determine a second similarity between the first representation and the third representation, compare the first similarity to a threshold, compare the second similarity to the threshold, and indicate whether the content is successfully shared with the remote device based on the comparison of the first similarity to the threshold and the comparison of the second similarity to the threshold.

15 Claims, 5 Drawing Sheets

CONTENT REPRESENTATIONS

BACKGROUND

Electronic devices such as desktops, laptops, notebooks, tablets, and smartphones include executable code (e.g., an application) that enables users to share content of the electronic devices with audiences. A user of an electronic device comprising the executable code that enables the user to share content (e.g., videoconferencing application) may share audio content, image content, video content, or a combination thereof.

BRIEF DESCRIPTION OF THE DRAWINGS

Various examples are described below referring to the following figures.

DETAILED DESCRIPTION

As described above, electronic devices include applications that enable users to share audio content, image content, video content, or a combination thereof with audiences. A host device, as used herein, is an electronic device sharing content of the electronic device. A user of the host device may share the content of a graphical user interface (GUI) of a display device (e.g., desktop), a GUI of an application (e.g., executable code that enables users to perform a task) displayed on the screen (e.g., a window of the desktop), an audio signal, or a combination thereof, for instance. The application that enables the user to share the content with the audience may include a visual indicator that notifies the user what content is shared with the audience. However, in some instances, the visual indicator is off the screen and therefore not visible. Additionally, user-level, application-level, networking-level, or system-level errors may introduce errors in the content, and the application that enables the user to share content does not provide a verification to the user that the audience receives a content the user intended to share (e.g., intended content).

This description describes examples of a host device to indicate to a user that shared content is received. In response to a request to share content, the host device may cause a display device to display the content on a GUI. In some examples, the host device inserts a watermark into the content prior to transmitting the content. The watermark, as used herein, is an identifying image or sound. The host device generates a first representation of the content. The representation, as used herein, is data that captures a distinguishing feature of the content. The first representation may be an image, a histogram of the image, a histogram of a video, a frame rate of the video, an audio sample of an audio content, a spectrogram of the audio content, or a combination thereof, for example. The host device transmits the content. The network server receives the content and generates a second representation of the content. The network server transmits the second representation to the host device. The network server transmits the content to the audience. An electronic device of an audience member receives the content and generates a third representation. An audience device, as used herein, is the electronic device of the audience member. A remote device, as used herein, is the network server, the audience device, or a combination thereof. The audience device transmits the third representation to the host device. The host device compares the first representation to the second representation to determine a first similarity and compares the first representation to the third representations to determine a second similarity. The similarity, as used herein, is a degree with which a feature of a first representation corresponds to a feature of a second representation. The host device compares the first similarity to a threshold and compares the second similarity to the threshold. The threshold, as used herein, is a value for the similarity to equal or exceed to indicate a successful sharing of content. The host device indicates whether the content is successfully shared based on the comparisons. In some examples, the host device displays the first representation to the user and prompts the user to verify that the content is the intended content.

By providing confirmation that the content is received, the user experience is enhanced because the user does not have to ask if the content is received. Without the interruption of confirmation questions, the audience experience is enhanced. The verification that the content is received may also provide a level of security to the user, the audience, or a combination thereof. The level of security for the user is provided because the user can confirm the content that was received is the intended content. The level of security for the user is provided because, utilizing watermarks, the user can confirm the content was received by an intended audience. The level of security for the audience is provided because, utilizing watermarks, the user may detect any errors in the content without compromising a privacy of an audience device.

In some examples in accordance with the present description, a host device is provided. The host device comprises a network interface and a processor. The processor is to, in response to a request to share content with a remote device, display the content in a graphical user interface. The content is a video. The processor is to generate an image of the content. The image is a frame of the video. The processor is to generate a first representation of the image, receive second and third representations of the image via the network interface, determine a first similarity between the first representation and the second representation, determine a second similarity between the first representation and the third representation, compare the first similarity to a threshold, compare the second similarity to the threshold, and indicate whether the content is successfully shared with the remote device based on the comparison of the first similarity to the threshold and the comparison of the second similarity to the threshold.

In another example in accordance with the present description, a host device is provided. The host device comprises a network interface and a processor. The processor is to, in response to a request to share content with a remote device, insert a watermark in the content. The processor is to generate a first representation of the content comprising the watermark, transmit the content comprising the watermark via the network interface, receive a second representation of the content via the network interface, and determine a similarity between the first representation and the second representation. The processor is to, responsive to the similarity falling below a threshold, cease to transmit the content via the network interface.

In another example in accordance with the present description, a non-transitory machine-readable medium is provided. The non-transitory machine-readable medium stores machine-readable instructions. When executed by a processor of a host device, the machine-readable instructions cause the processor to, in response to a request to share content with a remote device, generate a first representation of a first image of the content. When executed by the processor of the host device, the machine-readable instructions cause the processor to transmit the content based on the request and receive a second image via a network interface, where the second image is based on the content. When executed by the processor of the host device, the machine-readable instructions cause the processor to generate a second representation of the second image, determine a similarity between the first and the second representations, verify that the similarity exceeds a threshold, and display a result of the verification.

Figure 1:
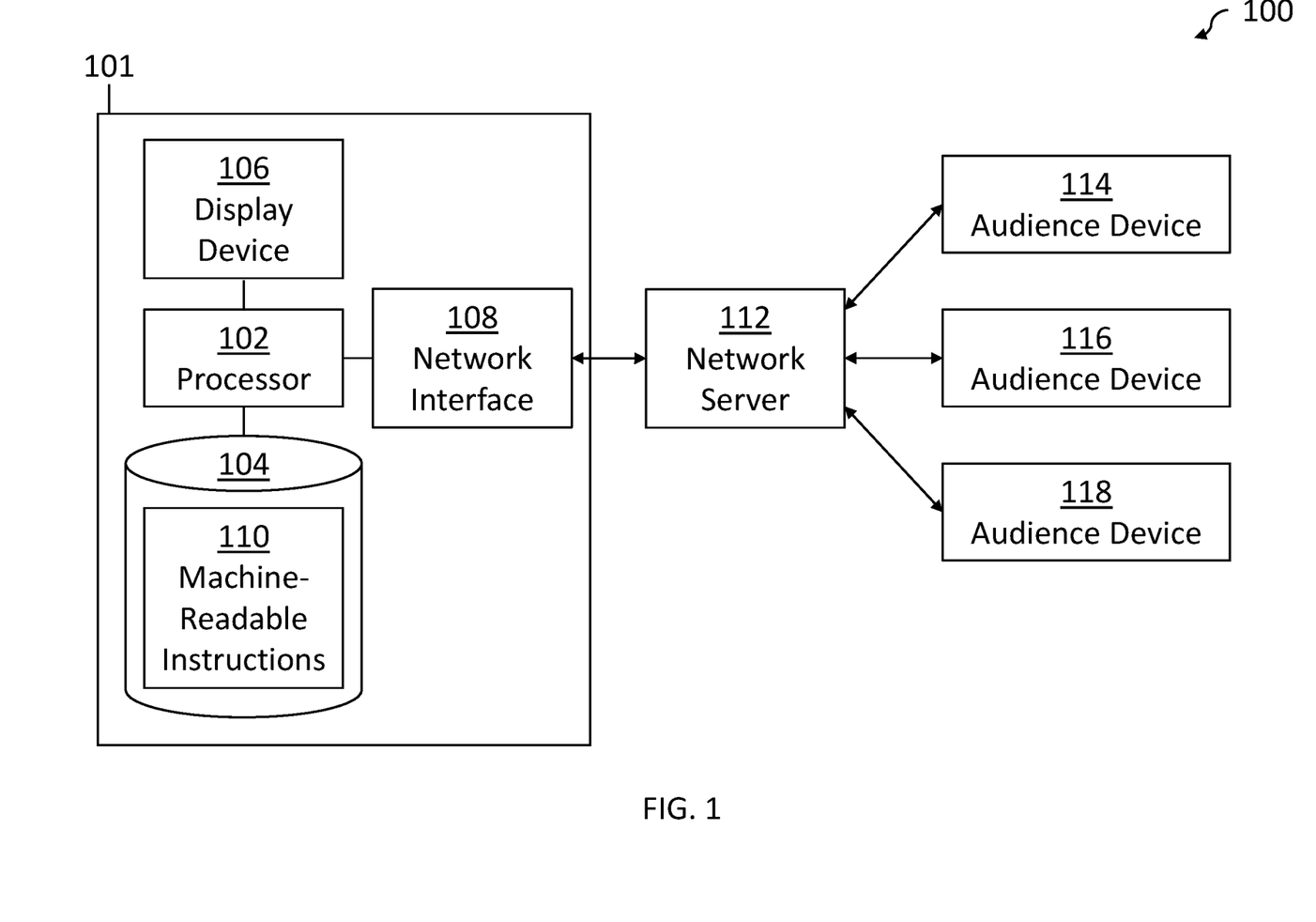
FIG. 1 is a schematic diagram of a system for sharing content of a host device with audience devices in accordance with various examples.

Referring now to FIG. 1, a schematic diagram of a system 100 for sharing content of a host device 101 with audience devices 114, 116, 118 is depicted in accordance with various examples. The system 100 may comprise the host device 101, a network server 112, and the audience devices 114, 116, 118. The host device 101 may be a desktop, a laptop, a notebook, a tablet, a smartphone, or any other suitable computing device that includes an application that enables users to share content of the computing device with audiences. The network server 112 may be a desktop, a laptop, a notebook, a tablet, a smartphone, or any other suitable computing device that includes an application that enables users to store data, send data to another electronic device, or receive data from another electronic device. An audience device 114, 116, 118 may be a desktop, a laptop, a notebook, a tablet, a smartphone, or any other suitable computing device that includes an application that enables users to view shared content. The host device 101 comprises a processor 102, a storage device 104, a display device 106, and a network interface 108. The processor 102 may be a microprocessor, a microcomputer, a microcontroller, a programmable integrated circuit, a programmable gate array, or other suitable device for managing operations of the host device 101. The storage device 104 may be a hard drive, a solid-state drive (SSD), flash memory, random access memory (RAM), or other suitable memory device for storing data and executable code of the host device 101. The display device 106 may be a liquid crystal display (LCD), a light-emitting diode (LED) display, a plasma display, a quantum dot (QD) LED display, or any suitable device for displaying data of the host device 101 for viewing. The network interface 108 may be any suitable device for facilitating communications between the host device 101 and the audience devices 114, 116, 118. The network interface 108 may connect to a network using a wired connection (e.g., Ethernet) or a wireless connection (e.g., BLUETOOTH®, WI-FI®). The network may be a local area network (LAN), a wide area network (WAN) (e.g., the Internet), a virtual private network (VPN), an enterprise private network (EPN), or any other suitable system that connects electronic devices for sharing data.

In some examples, the processor 102 couples to the storage device 104, the display device 106, and the network interface 108. The storage device 104 may store machine-readable instructions that, when executed by the processor 102, may cause the processor 102 to perform some or all of the actions attributed herein to the processor 102. The machine-readable instructions may be the machine-readable instructions 110.

While not explicitly shown, the audience devices 114, 116, 118 and the network server 112 may comprise a processor, a storage device storing machine-readable instructions, a display device, a network interface, or a combination thereof. In various examples, the network server 112 may also be an audience device of the audience devices 114, 116, 118 or the host device 101. In some examples, the audience devices 114, 116, 118 transmit data directly to the host device 101 and the host device 101 transmits data directly to the audience devices 114, 116, 118.

While the display device 106 is shown as an in-built display device 106 of the host device 101, in other examples, the display device 106 may be coupled to the host device 101 via a wired connection (e.g., Universal Serial Bus (USB), Video Graphics Array (VGA), Digital Visual Interface (DVI), High-Definition Multimedia Interface (HDMI)) or a stand-alone display device 106 coupled to the host device 101 via a wireless connection (e.g., WI-FI®, BLUETOOTH®).

Figure 2A:
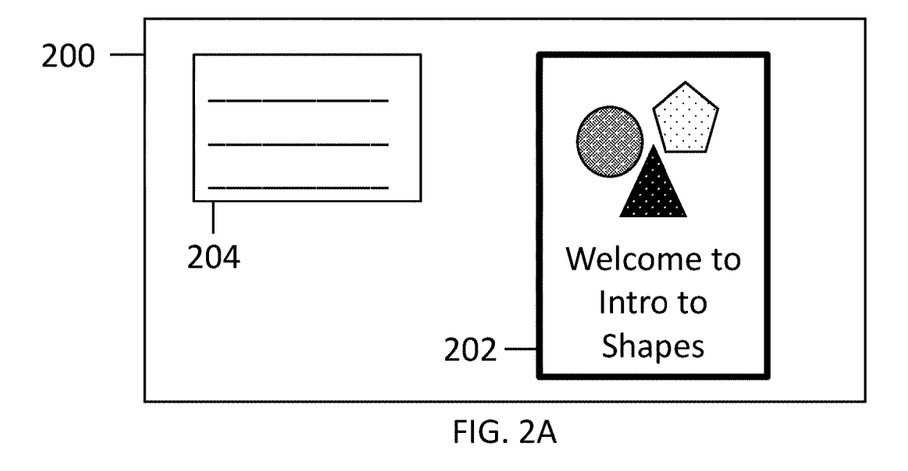
FIGS. 2A and 2B are examples of a display device of a host device sharing content and a display device of an audience device receiving the content in accordance with various examples.

As described above, in response to a request to share content, the processor 102 may cause the display device 106 to display the content. Refer to FIG. 2A below for an example of the display device 106 displaying the content. The response may be received from the user of the host device 101 or from the audience device 114, 116, 118. For example, an audience member utilizing the audience device 114 may request a user of the host device 101 to share content that is an image. The user may select the image utilizing a GUI displayed on the display device 106. For example, the user may utilize a GUI of an image sensor (not explicitly shown) of the host device 101 to generate the image. In another example, the user may utilize a GUI to select an image stored on the storage device 104. The processor 102 may cause a GUI of an application that enables users to share content to display the image. The processor 102 generates a first representation of the image. The first representation may be a histogram for the image, for example. The histogram may be a graphical representation of the tonal distribution in the image, for example. The processor 102 causes transmission of the image via the network interface 108.

Figure 2B:
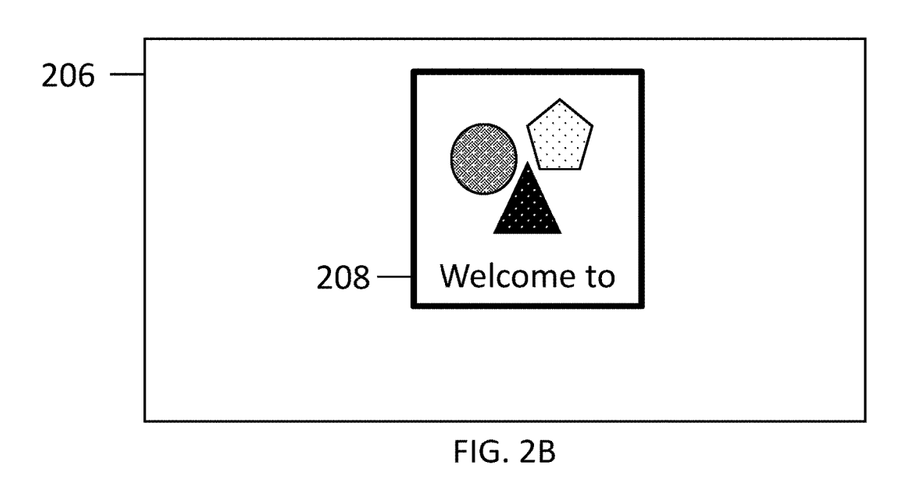

The network server 112 receives the image and generates a second representation of the image. The second representation includes a same type of data as the first representation. For example, responsive to the first representation that is a histogram for the image, the second representation is a histogram of the image received from the host device 101. The network server 112 transmits the second representation to the host device 101. The network server 112 transmits the image to the audience devices 114, 116, 118. In various examples, the network server 112, the audience devices 114, 116, 118, or some combination thereof display the image received on a respective display device. Refer to FIG. 2B below for an example of the display device of the network server 112 or the audience device 114, 116, 118 displaying the image received. The audience devices 114, 116, 118 receive the image and generate a third, a fourth, and a fifth representation, respectively. The third, the fourth, and the fifth representations include the same type of data as the first representation. For example, responsive to the first representation that is a histogram for the image, the third, the fourth, and the fifth representations include a histogram of the image received, respectively, from the network server 112. The audience devices 114, 116, 118 transmit the third, the fourth, and the fifth representation, respectively, to the host device 101.

The processor 102 compares the first representation to the second representation to determine a first similarity, the first representation to the third representation to determine a second similarity, the first representation to the fourth representation to determine a third similarity, and the first representation to the fifth representation to determine a fourth similarity. As described above, the first, the second, the third, and the fourth similarities are the degree with which the histogram of the second, the third, the fourth, and the fifth representations, respectively, correspond to the histogram of the first representation. The similarity may be expressed as a percentage, a ratio, or a fraction, for example. The processor 102 compares the first similarity to a threshold, the second similarity to the threshold, the third similarity to the threshold, and the fourth similarity to the threshold. As discussed above, the threshold is a value for the similarity to equal or exceed to indicate a successful sharing of content. The threshold may be expressed in a same term as the similarity. The threshold may be a percentage, a ratio, or a fraction, for example. The processor 102 indicates whether the content is successfully shared based on the comparisons. For example, responsive to the first, the second, the third, and the fourth similarity having values that equal or exceed the threshold, the processor 102 indicates the content is successfully shared with the remote device (e.g., the network server 112, the audience devices 114, 116, 118). In some examples, the processor 102 causes the GUI to display a green check mark or any other suitable indicator that notifies the user of a successful sharing of content.

In some examples, the processor 102 determines a value of the threshold based on the data of the representation. For example, the threshold may have a first value for a representation having data that is an image, a second value for a representation having data that is a histogram of the image, a third value for a representation having data that is a histogram of a video, a fourth value for a representation having data that is a frame rate of the video, a fifth value for a representation having data that is an audio sample of an audio content, a sixth value for a representation having data that is a spectrogram of the audio content, and a seventh value for a representation having data that is a combination of multiple distinguishing features. In another example, the threshold may have a value that is independent of the representation. For example, the threshold may be eight-tenths, 0.6, 75%, or any other value that indicates a reasonable degree of similarity between two representations. In some examples, the user may determine the threshold utilizing a GUI. In other examples, an application may determine the threshold. In yet other examples, the threshold may be set by a manufacturer of the host device 101.

By comparing the representations of the network server 112 and the audience devices 114, 116, 118 with the representation of the host device 101, the processor 102 may determine if a user-level, an application-level, a networking-level, or a system-level error introduces errors in the content. For example, responsive to the processor 102 determining that the comparisons of the similarities to the threshold indicate an unsuccessful sharing, the processor 102 may prompt the user to verify the content is the intended content. For example, responsive to the first, the second, the third, and the fourth similarity, respectively, having a value that is below the threshold, the processor 102 causes the GUI to prompt the user to verify the content is the intended content. In some examples, the processor 102 causes the GUI to display a red X mark or any other suitable indicator that notifies the user of a failure to share content.

In another example, responsive to the processor 102 determining that the comparison of the first similarity to the threshold indicates a successful sharing of the content with the network server 112 and that the comparisons of a remaining number of similarities indicate an unsuccessful sharing of the content with the audience devices 114, 116, 118, the processor 102 may cause the display device 106 to display a notification that a networking-level error has been introduced into the content. For example, responsive to the first similarity having a value that equals or exceeds the threshold and the second, the third, and the fourth similarity, respectively, having a value that is below the threshold, the processor 102 causes the GUI to display a notification that a networking-level error has been introduced into the content.

In yet another example, responsive to the processor 102 determining that the comparisons of the first similarity and a subset of the remaining similarities to the threshold indicate successful sharing of the content with the network server 112 and a subset of the audience devices 114, 116, 118, respectively, the processor 102 may cause the display device 106 to display a notification that an audience device of the audience devices 114, 116, 118 may be experiencing networking issues. For example, responsive to the first, the second, and the third similarities having values that equal or exceed the threshold and the fourth similarity having a value that is below the threshold, the processor 102 may cause the display device 106 to display a notification that the audience device 118 may be experiencing networking issues.

In various examples, the remote device receives the content transmitted by the host device 101 and detects the content is content for which to generate a representation. Utilizing an application or hardware components of the remote device, the remote device may detect the content is content for which to generate a representation. For example, the remote device may cause an application to execute and access the contents (e.g., a videoconferencing application). In another example, the remote device may examine the content utilizing an application that manages operations (e.g., a driver, an operating system (OS) service) of an image sensor (not explicitly shown), an audio input device (not explicitly shown), or an audio output device (not explicitly shown) of the remote device. In yet another example, the remote device may examine the content by accessing hardware components (e.g., memory buffers) utilized by the image sensor (not explicitly shown), the audio input device (not explicitly shown), the audio output device (not explicitly shown), the display device (not explicitly shown), or a combination thereof. In another example, the remote device may examine the content by examining a second content received by the image sensor (not explicitly shown), the audio output device (not explicitly shown), the audio input device (not explicitly shown, or a combination thereof.

Referring now to FIGS. 2A and 2B, examples of a display device 200 of a host device sharing content and a display device 206 of an audience device receiving the content are depicted in accordance with various examples. FIG. 2A includes the display device 200 displaying windows 202, 204. The display device 200 may be the display device 106 of the host device 101. The window 202 displays an image comprising shapes and words. The image may be a first image of a presentation on shapes. The window 204 displays a GUI for a word processing application. FIG. 2B includes the display device 206 displaying a window 208. The display device 206 may be a display device (not explicitly shown) of a network server (e.g., the network server 112) or the audience device (e.g., the audience device 114, 116, 118). The window 208 displays a portion of the image comprising shapes and words.

As described above with respect to FIG. 1, in response to a request to share content, a processor (e.g., the processor 102) may cause the display device 200 to display the content. For example, the user may receive a request to share a presentation on shapes. The user may select the presentation utilizing a GUI. The processor may cause the display device 200 to display the presentation in window 202. As indicated by the thicker black outline, the window 202 may be an active window. The active window, as used herein, is the window in a foreground of the display device 200 that receives user input. The window 204 may be an inactive window, or a window in a background of the display device 200 that does not receive user input.

The processor generates a first representation of the presentation. The first representation may be an image of the presentation, for example. In some examples, the image may be a first image of the presentation. For example, the first image of the presentation may be an image comprising a title (e.g., an image of a title page). In other examples, the image may be an identifying image of the presentation. For example, the selected image may be a first page of the presentation after the title page. The first representation may be the image of the window 202, for example. In some examples, the processor may cause a GUI of the display device 200 to display the first representation and prompt the user to verify that the first representation represents a content the user intended to share. For example, the processor may cause a new window (not explicitly shown) to appear on the desktop, may cause the new window to display the first representation, and may prompt the user to verify that the first representation is an image of the presentation that the user intended to share. Responsive to the verification, the processor may cause the new window to close and make the window 202 the active window. In another example, the processor may cause the window 202 to display the first representation and prompt the user to verify that the first representation is an image of the presentation that the user intended to share. In some examples, responsive to a failed verification, the processor may notify the user that a user-level or an application-level error has occurred.

The network server (e.g., the network server 112) or an audience device (e.g., the audience device 114, 116, 118) receives the presentation. The network server or the audience device displays the presentation on the display device 206 and generates a second representation of the presentation. Responsive to the first representation comprising an image of the title page, the second representation comprises an image of the title page. The second representation may be the image of the window 208, for example. The network server or the audience device transmits the second representation to the host device.

The processor compares the first representation to the second representation to determine a similarity. While the first representation, as described above, includes an image, a histogram of the image, a histogram of a video, a frame rate of the video, an audio sample of an audio content, a spectrogram of the audio content, or a combination thereof, the first representation may include any distinguishing feature of an image content, a video content, or an audio content. The processor may determine a distinguishing feature of the content utilizing a computer vision technique, a keyword recognition technique, or an audio feature extraction technique. In some examples, the processor compares a feature of the first representation to a feature of the second representation to determine the similarity. For example, the processor may compare a circle of the image of the window 202 to a circle of the image of the window 208. In various examples, prior to the comparison, the processor may increase or decrease a size of the first representation, the second representation, or a combination thereof so that the first representation and the second representation are of a similar scale, or size. For example, the processor may scale the first representation, the second representation, or a combination thereof such that the circle of the image of the window 202 and the circle of the image of the window 208 are of a comparable size (e.g., a dimension of the first representation is within a 5% tolerance of a dimension of the second representation). In various examples, the processor compares multiple features of the first representation to multiple features of the second representation to determine the similarity. The processor determines the similarity based on the degree with which the feature of the first representation agrees with the feature of the second representation.

The processor compares the similarity to a threshold. For example, the threshold may be 60%. Responsive to the similarity that indicates the first representation and the second representation have 60% of features in common, the processor indicates that the content is successfully shared. In some examples, the processor may cause the display device 200 to overlay the window 202 with an indicator that indicates a result of the comparison. For example, responsive to a comparison that indicates that the first and the second representation have 65% of features in common, the processor may cause the display device 200 to overlay the window 202 with a check mark. In another example, responsive to the similarity that indicates that the first and the second representations have 35% of features in common, the processor may cause the display device 200 to overlay the window 202 with a red X.

By the host device 101 providing confirmation that the content is received, the user experience is enhanced because the user does not have to ask if the content is received. Without the interruption of confirmation questions, the audience experience is enhanced. The verification that the content is received may also provide a level of security to the user because the user can confirm the content that was received is the intended content.

Figure 3:
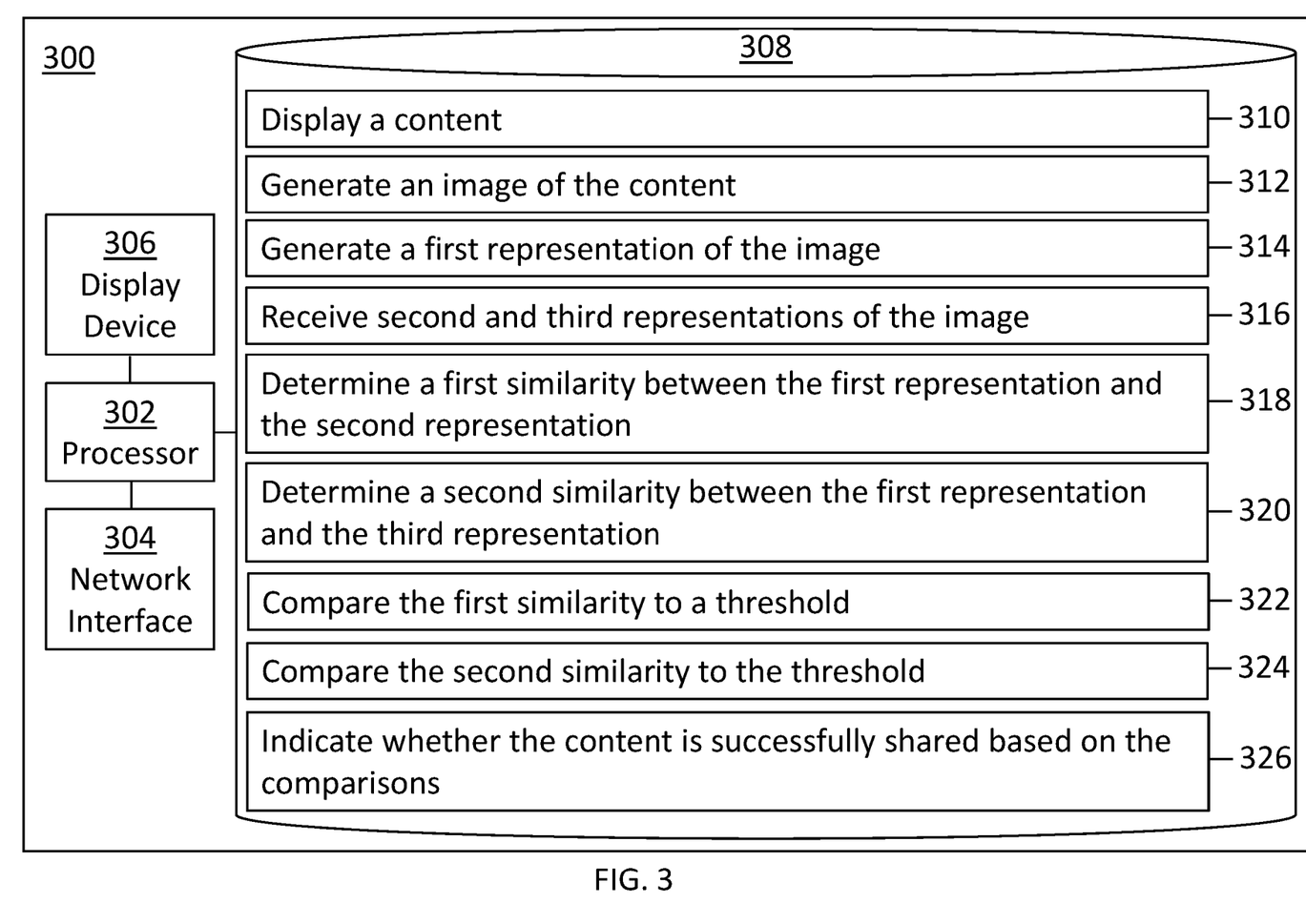
FIG. 3 is a schematic diagram of a host device for verifying content representations in accordance with various examples.

Referring now to FIG. 3, a schematic diagram of a host device 300 for verifying content representations is depicted in accordance with various examples. The host device 300 may be the host device 101. The host device 300 comprises a processor 302, a network interface 304, a display device 306, and a storage device 308. The processor 302 may be the processor 102. The network interface 304 may be the network interface 108. The display device 306 may be the display device 200, 106. The storage device 308 may be the storage device 104.

In some examples, the processor 302 couples to the network interface 304, the display device 306, and the storage device 308. The storage device 308 may store machine-readable instructions that, when executed by the processor 302, may cause the processor 302 to perform some or all of the actions attributed herein to the processor 302. The machine-readable instructions may be the machine-readable instructions 310, 312, 314, 316, 318, 320, 322, 324, 326. The machine-readable instructions 310, 312, 314, 316, 318, 320, 322, 324, 326 may be the machine-readable instructions 110.

In various examples, when executed by the processor 302, the machine-readable instructions 310, 312, 314, 316, 318, 320, 322, 324, 326 cause the processor 302 to verify content representations. The machine-readable instruction 310 causes the processor 302 to display a content. As described above with respect to FIGS. 1 and 2, the processor 302 may cause the display device 306 to display the content. The machine-readable instruction 312 causes the processor 302 to generate an image of the content. As described above, the content may be a presentation and the processor 302 may generate the image based on a title page of the presentation, for example. The machine-readable instruction 314 causes the processor 302 to generate a first representation of the image. The processor 302 may generate the first representation of the image utilizing the techniques described above with respect to FIGS. 1 and 2, for example. The machine-readable instruction 316 causes the processor 302 to receive second and third representations of the image. As described above with respect to FIGS. 1 and 2, the second and the third representations may be transmitted by a network server (e.g., the network server 112) or an audience device (e.g., the audience devices 114, 116, 118). The machine-readable instruction 318 causes the processor 302 to determine a first similarity between the first representation and the second representation. The machine-readable instruction 320 causes the processor 302 to determine a second similarity between the first representation and the third representation. The processor 302 may determine the first and the second similarity utilizing the techniques described above with respect to FIGS. 1 and 2, for example. The machine-readable instruction 322 causes the processor 302 to compare the first similarity to a threshold. The machine-readable instruction 324 causes the processor 302 to compare the second similarity to the threshold. The processor 302 may compare the first and the second similarity to the threshold utilizing the techniques described above with respect to FIGS. 1 and 2, for example. The machine-readable instruction 326 causes the processor 302 to indicate whether the content is successfully shared based on the comparisons. The processor 302 may indicate whether the content is successfully shared based on the comparisons utilizing the techniques described above with respect to FIGS. 1 and 2, for example.

In some examples, the processor 302, in response to a request to share content with a remote device, causes the display device 306 to display the content in a GUI, as described above with respect to FIGS. 1 and 2. The content may be a video, for example. An image sensor (not explicitly shown) of the host device 300 may record the video, for example. The image sensor (not explicitly shown) may be an external image sensor coupled to the host device 300 or an internal image sensor, for example. The processor 302 generates an image that is a frame of the video. The frame may be a first frame of the video, for example. In other examples, the frame may be an identifying frame of the video. For example, the identifying frame may be a frame comprising a title of the video. In another example, the identifying frame may be a frame of an opening scene of the video. The processor 302 generates a first representation of the image. The first representation of the image may be the image that is a frame of the video, for example. In another example, the first representation may be a histogram of the image. The processor 302 receives the second and the third representations of the image via the network interface 304. As described above with respect to FIGS. 1 and 2, the second and the third representations of the image are representations of the image received from the host device 300. Utilizing the techniques described above with respect to FIGS. 1 and 2, the processor 302 determines a first similarity between the first representation and the second representation and determines a second similarity between the first representation and the third representation. The processor 302 compares the first similarity to a threshold and compares the second similarity to the threshold utilizing the techniques described above with respect to FIGS. 1 and 2. The processor 302 indicates whether the content is successfully shared with the remote device (e.g., the audience device 114, 116, 118, the network server 112) based on the comparison of the first similarity to the threshold and the comparison of the second similarity to the threshold. As described above with respect to FIGS. 1 and 2, the processor 302 may cause the display device 306 to display the indication.

Figure 4:
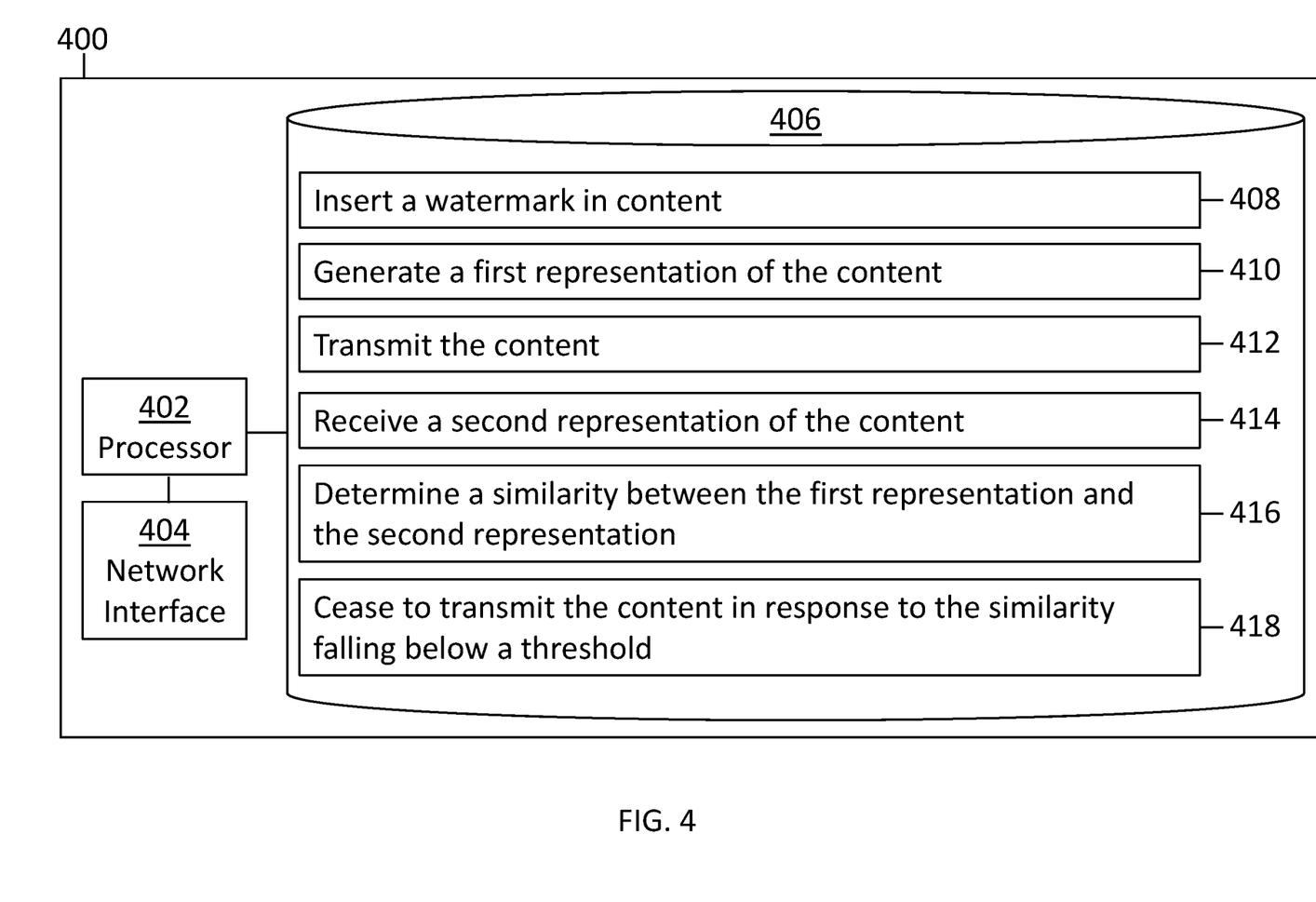
FIG. 4 is a schematic diagram of a host device for verifying content representations in accordance with various examples.

Referring now to FIG. 4, a schematic diagram of a host device 400 for verifying content representations is depicted in accordance with various examples. The host device 400 may be the host device 101, 300. The host device 400 comprises a processor 402, a network interface 404, and a storage device 406. The processor 402 may be the processor 102, 302. The network interface 404 may be the network interface 108, 304. The storage device 406 may be the storage device 104, 308.

In some examples, the processor 402 couples to the network interface 404 and the storage device 406. The storage device 406 may store machine-readable instructions that, when executed by the processor 402, may cause the processor 402 to perform some or all of the actions attributed herein to the processor 402. The machine-readable instructions may be the machine-readable instructions 408, 410, 412, 414, 416, 418. The machine-readable instructions 408, 410, 412, 414, 416, 418 may be the machine-readable instructions 110.

In various examples, when executed by the processor 402, the machine-readable instructions 408, 410, 412, 414, 416, 418 cause the processor 402 to verify content representations. The machine-readable instruction 408 causes the processor 402 to insert a watermark in content. As described above, the watermark is an identifying image or sound. The machine-readable instruction 410 causes the processor 402 to generate a first representation of the content. The processor 402 may utilize the techniques described above with respect to FIGS. 1-3 to generate the first representation. The machine-readable instruction 412 causes the processor 402 to transmit the content. The machine-readable instruction 414 causes the processor 402 to receive a second representation of the content. As described above with respect to FIGS. 1-3, the second representation of the content is a representation of the content received by a remote device (e.g., the network server 112, the audience device 114, 116, 118). The machine-readable instruction 416 causes the processor 402 to determine a similarity between the first representation and the second representation. The processor 402 may utilize the techniques described above with respect to FIGS. 1-3 to determine the similarity. The machine-readable instruction 418 causes the processor 402 to cease to transmit the content in response to the similarity falling below a threshold. The processor 402 may utilize the techniques described above with respect to FIGS. 1-3 to determine whether the similarity is below the threshold.

In various examples, the processor 402, in response to a request to share content with the remote device, inserts a watermark in the content. Inserting the watermark in the content modifies the content with the identifying image or sound of the watermark. A watermark image may be a distinct image or a pattern that is distributed across the content or that is placed at a particular location of the content, for example. A watermark sound may be a sound that is a spread spectrum, a sculpted comfort noise, a harmonic distortion, a distinct phrase, an ultrasonic sound, any other sound that a user may not be able to hear but that the processor 402 may detect, or a combination thereof, for example. The processor 402 generates a first representation of the content comprising the watermark. The processor 402 transmits the content comprising the watermark via the network interface 404. The processor 402 receives a second representation of the content via the network interface 404. As described above with respect to FIGS. 1-3, the second representation of the content is a representation of the content received from the host device 400. The processor 402 determines a similarity between the first representation and the second representation. The processor 402, responsive to the similarity falling below a threshold, ceases to transmit the content via the network interface 404.

In some examples, the processor 402 determines the similarity between the first representation and the second representation by comparing the watermark of the first representation with a watermark of the second representation. In various examples, responsive to the similarity falling below the threshold, the processor 402 causes a display device (e.g., the display device 106, 200, 306) to notify the user that a security level has been compromised. In other examples, the processor 402 causes a display device (e.g., the display device 106, 200, 306) to display an indicator that indicates the share of the content is unsuccessful.

By utilizing watermarks, the user can confirm the content was received by an intended audience. The level of security for the audience is provided because, utilizing watermarks, the user may detect any errors in the content without compromising a privacy of an audience device.

Figure 5:
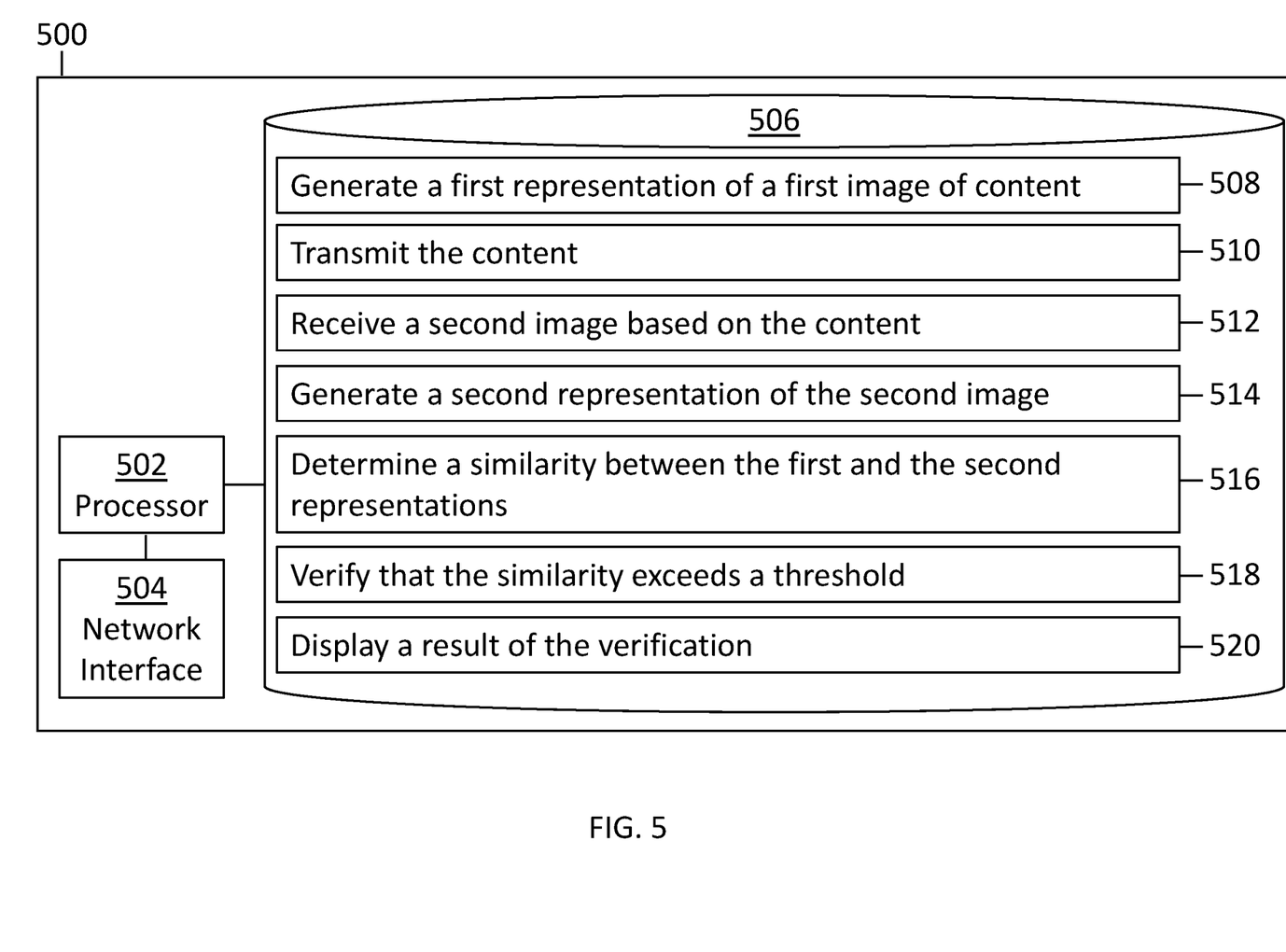
FIG. 5 is a schematic diagram of a host device for verifying content representations in accordance with various examples.

Referring now to FIG. 5, a schematic diagram of a host device 500 for verifying content representations is depicted in accordance with various examples. The host device 500 may be the host device 400, 300, 101. The host device 500 comprises a processor 502, a network interface 504, and a non-transitory machine-readable medium 506. The non-transitory machine-readable medium 506 may be the storage device 104, 308, 406. The term "non-transitory" does not encompass transitory propagating signals.

In various examples, the host device 500 comprises the processor 502 coupled to the network interface 504 and the non-transitory machine-readable medium 506. The non-transitory machine-readable medium 506 may store machine-readable instructions. The machine-readable instructions may be the machine-readable instructions 508, 510, 512, 514, 516, 518, 520. The machine-readable instructions 508, 510, 512, 514, 516, 518, 520 may be the machine-readable instructions 110. The machine-readable instructions 508, 510, 512, 514, 516, 518, 520 when executed by the processor 502, may cause the processor 502 to perform some or all of the actions attributed herein to the processor 502.

In various examples, when executed by the processor 502, the machine-readable instructions 508, 510, 512, 514, 516, 518, 520 cause the processor 502 to verify content representations. The machine-readable instruction 508 may cause the processor 502 to generate a first representation of a first image of content. As described above with respect to FIGS. 1-4, the first image of content may be an image of a presentation or a video, for example. The processor 502 may generate the first representation utilizing the techniques described above with respect to FIGS. 1-4. The machine-readable instruction 510 may cause the processor 502 to transmit the content. The machine-readable instruction 512 may cause the processor 502 to receive a second image based on the content. The machine-readable instruction 514 may cause the processor 502 to generate a second representation of the second image utilizing the techniques described above with respect to FIGS. 1-4. The machine-readable instruction 516 may cause the processor 502 to determine a similarity between the first and the second representations utilizing the techniques described above with respect to FIGS. 1-4. The machine-readable instruction 518 may cause the processor 502 to verify that the similarity exceeds a threshold utilizing the techniques described above with respect to FIGS. 1-4. The machine-readable instruction 520 may cause the processor 502 to display a result of the verification as described above with respect to FIGS. 1-4.

In various examples, the processor 502, in response to a request to share content with a remote device (e.g., the network server 112, the audience device 114, 116, 118), generates the first representation of the first image of the first content. The processor 502 transmits the content via the network interface 504 based on the request. The processor 502 receives the second image via the network interface 504. The second image is based on the first content. The remote device may generate the second image and insert the second image in a second content. In some examples, the remote device may generate the second image upon receipt of the content. In other examples, the remote device may display or play the first content and generate the second image. The remote device transmits the second content. The processor 502 may receive the second content. The processor 502 may analyze the second content to identify and isolate the second image. The processor 502 may utilize a computer vision technique, a keyword recognition technique, or an audio feature extraction technique to analyze the second content to identify the second image. In some examples, the computer vision technique, the keyword recognition technique, or the audio feature extraction technique may utilize a machine learning technique such as hidden Markov Models or a convolutional neural network (CNN). For example, the processor 502 may utilize a computer vision technique such as image classification, object detection, object tracking, semantic segmentation, instance segmentation, or a combination thereof. In another example, the processor 502 may utilize a keyword recognition technique such as word frequency, word collocations, word co-occurrences, or a combination thereof. In yet another example, the processor 502 may utilize an audio feature extraction technique such as linear predictions, wavelet transformations, or a combination thereof. The processor 502 generates the second representation of the second image, determines a similarity between the first and the second representations, verifies that the similarity exceeds the threshold, and displays the result of the verification utilizing the techniques described above with respect to FIGS. 1-4.

In some examples, the first image of the content may be an image of an audio content. The audio content may be received from an audio input device (not explicitly shown) of the host device 500. The audio input device may be an external microphone coupled to the host device 500 or an internal microphone, for example. The image of the audio content may be an image of a waveform of the audio content. The waveform may be for a duration of the audio content, comprise a watermark, or a combination thereof. For example, the duration may be a first 5 seconds, and the image of the waveform is for the first 5 seconds of the audio content. In another example, the image of the audio content may be an image of a waveform for a duration comprising a watermark inserted in the audio content. In various examples, the second content may be a second audio content and an image content. As described above with respect to FIG. 1, the remote device may detect the content by accessing the content. Accessing the content may cause the remote device to generate the second content. The image content may be an image of the audio content received by the remote device, for example.

In other examples, the techniques described above may also be utilized to repeatedly verify the content. The verification may occur at intervals of a sharing session. For example, the processor 502 may perform the techniques described above at 5- or 10-minute intervals. The machine-readable instructions may cause the processor 502 to generate a first representation of a current image of the content, to transmit the content, and to receive a second image based on the content. The machine-readable instructions may cause the processor 502 to generate a second representation of the second image, determine a similarity between the first and the second representations, verify that the similarity exceeds a threshold, and display a result of the verification.

The processor 502 may generate a representation based on a current image of the content. By repeatedly verifying the content, the processor 502 may provide a level of security to the user and improve the user experience by keeping the user informed on a state of the share. For example, the processor 502 may identify a remote device that is experiencing networking issues based on repeated comparisons indicating a similarity between a representation of the remote device and the host device 500 are below the threshold.

By providing confirmation that the content is received, the host device 101, 300, 400, 500 improves the user experience by enabling the user to refrain from asking if the content is received. Without the interruption of confirmation questions, the audience experience is enhanced. The verification that the content is received may also provide a level of security to the user, the audience, or a combination thereof. The level of security for the user is provided because the user can confirm the content that was received is the intended content. The level of security for the user is provided because, utilizing watermarks, the user can confirm the content was received by an intended audience.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. A host device, comprising:
a network interface; and
a processor to:
in response to a request to share content with a remote device, display the content in a graphical user interface (GUI),
wherein the content is a video;
generate an image of the content, wherein the image is a frame of the video;
generate a first representation of the image;
receive second and third representations of the image via the network interface;
determine a first similarity between the first representation and the second representation;
determine a second similarity between the first representation and the third representation;
compare the first similarity to a threshold;
compare the second similarity to the threshold; and
indicate whether the content is successfully shared with the remote device based on the comparison of the first similarity to the threshold and the comparison of the second similarity to the threshold.

2. The host device of claim 1, wherein the processor is to:
cause the GUI to display the first representation; and
prompt a user to verify that the first representation represents a content the user intended to share.

3. The host device of claim 1, wherein, responsive to the first and the second similarities having values that equal or exceed the threshold, the processor is to indicate the content is successfully shared with the remote device.

4. The host device of claim 1, wherein, responsive to the first and the second similarities having values that are below the threshold, the processor is to cause the GUI to prompt a user to verify the content is a content the user intended to share.

5. The host device of claim 1, wherein, responsive to the first similarity having a value that equals or exceeds the threshold and the second similarity having a value that is below the threshold, the processor is to cause the GUI to display a notification that an error has been introduced into the content.

6. A host device, comprising:
a network interface; and
a processor to:
in response to a request to share content with a remote device, insert a watermark in the content;
generate a first representation of the content comprising the watermark;
transmit the content comprising the watermark via the network interface;
receive a second representation of the content via the network interface;
determine a similarity between the first representation and the second representation; and
responsive to the similarity falling below a threshold, cease to transmit the content via the network interface.

7. The host device of claim 6, wherein the content is audio content, image content, video content, or a combination thereof.

8. The host device of claim 6, wherein the watermark is an image or a sound.

9. The host device of claim 8, wherein the sound is a spread spectrum, a sculpted comfort noise, a harmonic distortion, a distinct phrase, an ultrasonic sound, or a combination thereof.

10. The host device of claim 6, wherein the first representation is an image, a histogram of the image, a histogram of a video, a frame rate of the video, an audio sample of an audio content, a spectrogram of the audio content, or a combination thereof.

11. A non-transitory machine-readable medium storing machine-readable instructions which, when executed by a processor of a host device, cause the processor to:
in response to a request to share content with a remote device, generate a first representation of a first image of the content;
transmit the content based on the request;
receive a second image via a network interface, wherein the second image is based on the content;
generate a second representation of the second image;
determine a similarity between the first and the second representations;
verify that the similarity exceeds a threshold; and
display a result of the verification.

12. The non-transitory machine-readable medium of claim 11, wherein the first image of the content is an image of an audio content, and wherein the image of the audio content is an image of a waveform of the audio content.

13. The non-transitory machine-readable medium of claim 12, wherein the waveform is for a duration of the audio content, comprises a watermark, or a combination thereof.

14. The non-transitory machine-readable medium of claim 11, wherein the machine-readable instructions, when executed by the processor of the host device, cause the processor to utilize a computer vision technique, a keyword recognition technique, or an audio feature extraction technique to identify the second image.

15. The non-transitory machine-readable medium of claim 11, wherein the machine-readable instructions, when executed by the processor of the host device, cause the processor to repeatedly verify the content.

\* \* \* \* \*